(12) United States Patent  (10) Patent No.: US 8,474,104 B2
Watson                     (45) Date of Patent:     Jul. 2, 2013

(54) CABLE TIE

(76) Inventor: Robert Baird Watson, Pakenham (AU)

( * ) Notice: Subject to any disclaimer, the term of this patent is extended or adjusted under 35 U.S.C. 154(b) by 197 days.

(21) Appl. No.: 13/054,196

(22) PCT Filed: Jul. 6, 2009

(86) PCT No.: PCT/AU2009/000868
§ 371 (c)(1),
(2), (4) Date: Feb. 25, 2011

(87) PCT Pub. No.: WO2010/006358
PCT Pub. Date: Jan. 21, 2010

(65) Prior Publication Data
US 2011/0131768 A1    Jun. 9, 2011

(30) Foreign Application Priority Data
Jul. 16, 2008  (AU) ................. 2008903638

(51) Int. Cl.
*B65D 63/10*    (2006.01)
(52) U.S. Cl.
USPC ........................................ 24/16 PB
(58) Field of Classification Search
USPC ............ 24/16 R, 16 PB, 17 A, 17 AP, 30.5 P
See application file for complete search history.

(56) References Cited

U.S. PATENT DOCUMENTS 3,654,669 A    4/1972  Fulton
4,665,588 A *  5/1987  Nakano ................. 24/16 PB
4,882,813 A   11/1989  Nakamura
6,507,979 B1 * 1/2003  Thompson ............... 24/16 PB
6,513,555 B1   2/2003  Lesser et al.
2008/0083095 A1 4/2008 Coles et al.

FOREIGN PATENT DOCUMENTS

AU    724 496 B2    9/2000
EP    0 759 523 A1  2/1997
EP    1 013 554 A1  6/2000
NL    1004356       4/1998

OTHER PUBLICATIONS

Extended European Search Report dated Nov. 7, 2012 received in application No. EP 09 79 7256.

* cited by examiner

*Primary Examiner* — James Brittain
(74) *Attorney, Agent, or Firm* — Maschoff Brennan

(57) ABSTRACT

A binding head and binding arrangement that cooperates with an elongate member that has a fastening end and a locking end. The fastening end is spaced apart from the locking end along the length of the elongate member and each elongate member has at least one lengthwise side that includes at least two teeth. The binding head includes a fastening opening for receiving a fastening end of an elongate member. The fastening opening includes a first fastening arrangement configured to cooperate with at least one of the teeth of the elongate member to lock a portion of the elongate member within the fastening opening; and a locking opening for receiving a locking end of an elongate member. The locking opening includes a second fastening arrangement configured to cooperate with at least one of the teeth of the elongate member to lock a portion of the elongate member within the locking opening. A cable tie is also claimed which includes the binding head and binding arrangement.

18 Claims, 3 Drawing Sheets

CABLE TIE

FIELD OF THE INVENTION

The present invention generally relates to a binding head, a binding arrangement and an improved cable tie that can be formed using the binding head and the binding arrangement. The invention is particularly applicable in relation to cable tie type devices and it will be convenient to hereinafter disclose the invention in relation to that exemplary application. However, it is to be appreciated that the invention is not limited to that application and could be used to in relation to other similar fastening or binding arrangements.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Cable ties are traditionally used to bind together at least two items such as cables or wires. A typical cable tie includes a fastening head attached to one end of an elongate member, typically in the form of a strap. The strap can be wrapped around at least two items and then its free "fastening" end can be pulled through and fastened within the fastening head, securing the cable tie around the items. The strap and the fastening head are locked together using a cooperating unidirectional fastening arrangement. Accordingly, a user can wrap the strap portion of the cable tie around the items, insert the fastening end of the strap into and through the fastening head, and pull the strap tight around the cables to bind the items together. An excess portion of the strap not wrapped around the cables can then cut off and discarded.

It is common to use a cable tie having a longer strap than is required for that binding application. In some cases, the excess or discarded portion of strap can have a substantial and therefore useful length. It would be more economic to be able to reuse this substantial portion of discarded strap for further binding applications.

It is therefore desirable to provide an improved cable tie in which a discarded strap portion of that or another cable tie could be used for a further binding application.

SUMMARY OF THE INVENTION

According to a first aspect of the present invention, there is provided a binding head for receiving at least two portions of at least one elongate member, each elongate member having a fastening end and a locking end, the fastening end being spaced apart from the locking end along the length of the elongate member, each elongate member also having at least one lengthwise side that includes at least two teeth, the binding head including:
  a fastening opening for receiving a fastening end of an elongate member, the fastening opening including a first fastening arrangement configured to cooperate with at least one of the teeth of the elongate member to lock a portion of the elongate member within the fastening opening; and
  a locking opening for receiving a locking end of an elongate member, the locking opening including a second fastening arrangement configured to cooperate with at least one of the teeth of the elongate member to lock a portion of the elongate member within the locking opening.

Accordingly, this aspect of the present invention provides a binding head which can be used in conjunction with a discarded strap portion of a cable tie or similar section of cable tie strap to form a binding arrangement. In this respect, the severed end of the discarded scrap portion of the strap can be received and locked into the locking opening of the binding head to form a cable tie type device. The other end of the strap can then be received and locked within the fastening opening of the binding head to bind items together. The fastening opening and locking opening would ideally have cooperating configurations with the discarded portion of the strap and its teeth for optimal fastening between the binding head and discarded strap portion.

Any suitable fastening arrangement can be used for the first fastening arrangement and the second fastening arrangement. In some embodiments, the first fastening arrangement has the same configuration as the second fastening arrangement. In other embodiments, the first fastening arrangement has a different configuration to the second fastening arrangement. One or both of the first or second fastening arrangements could be configured to releasably lock a portion of the elongate member within the fastening opening or locking opening respectively.

The first and/or second fastening arrangement can include at least one resilient member extending from an inner surface of the opening, and an abutment surface adjacent to the resilient member. In use, the resilient member engages with at least one of the teeth of the elongate member when a portion of the elongate member is inserted into the respective locking opening and/or fastening opening thereby securing said portion of the elongate member between at least one of the resilient members and the abutment surface.

The resilient member can have any suitable configuration. In one embodiment, the resilient member comprises a generally rectangular body. The resilient member is generally configured to engage and interlock with the teeth of an elongate member. Some resilient members can include an engagement surface having a substantially complementary configuration to at least one of the teeth of the elongate member. Preferably, this engagement surface includes a portion which is generally perpendicular to the length of the elongate member configured to abut a complementary surface of the teeth of the elongate member to resist lengthwise movement of the elongate member in a direction away from the opening. In some embodiments, the engagement surface is located at a free end of the resilient members. Where the teeth of the elongate member have a sloped surface, each of the free ends of the resilient members can include a complementary sloped surface.

At least one of, but preferably each of the first fastening arrangement and second fastening arrangement is a unidirectional fastening arrangement configured to engage with at least one of the teeth of the elongate member. In one embodiment, the unidirectional fastening arrangement includes a pawl which, in use, engages with at least one of the teeth when the elongate member has been inserted through the opening. This type of pawl type fastening arrangement is used in a number of existing cable tie binding head arrangements and provides a strong uni-directional lock between the teeth on an elongate member and the pawl.

The fastening opening can have any suitable configuration. The fastening opening is generally a through-hole in the binding head through which the elongate member can be threaded to allow the size of a loop formed by the elongate member to be adjustable. In comparison, the locking opening is preferably configured to lock only a locking end of an elongate member into the locking opening. The locking opening is thus preferably a blind opening having an inner wall against which the locking end of the elongate member can abut. A portion of the elongate member proximate to the locking end of the elongate member can be locked into the locking opening.

The teeth of the elongate member preferably comprise a plurality of ratchet teeth arranged as a track substantially along the length of the elongate member. The resilient member can therefore be configured to abut at least one of the ratchet teeth in the track. Where the ratchet teeth includes a first engagement surface generally acutely angled to the length of the elongate member and a second engagement surface generally perpendicular to the length of the elongate member, the resilient members can be configured to substantially mate with each of the engagement surfaces.

In some embodiments, each elongate member includes at least two separate lengthwise sides. A first side of the elongate member includes at least one tooth configured to cooperate with the first fastening arrangement to lock a portion of the elongate member within the fastening opening. A second side of the elongate member includes at least one tooth configured to cooperate with the second fastening arrangement to lock a portion of the elongate member within the locking opening.

The teeth of each side of the elongate member can form a track having a shape that is generally directionally arranged relative to the fastening end of the elongate member. Where the teeth are ratchet teeth, the teeth on one side of the elongate member can include a sloped surface which is oriented towards the fastening end of the elongate member. Where the elongate member has teeth on two sides, it is preferred that the teeth of the first side of the elongate member are arranged as a track orientated in a first direction along the length of the elongate member and the teeth of the second side of the elongate member are arranged as a track orientated in a second direction along the length of the elongate member. More preferably, the first direction is in substantially the opposite direction to the second direction. In these embodiments, the directionally arranged teeth can be configured to directionally cooperate with the unidirectional fastening arrangement of the respective fastening arrangement. In such arrangements, each of the fastening and locking openings are preferably configured to receive and lock the elongate member therein with the teeth orientated in the opposite direction to the fastening direction of the respective fastening arrangement.

According to a second aspect of the present invention, there is provided a binding arrangement including:
an elongate member having at least a fastening end and a locking end, the fastening end being spaced apart from the locking end along the length of the elongate member, the elongate member also having at least one lengthwise side that includes at least two teeth; and
a binding head according to the first aspect of the present invention.

In use, the fastening opening of the binding head receives the fastening end of the elongate member with the first fastening arrangement locking a portion of the elongate member therein. Furthermore, in use, the locking opening receives the locking end of the elongate member with the second fastening arrangement locking a portion of the elongate member therein.

Accordingly, this aspect of the present invention provides a combination of a binding head according to the first aspect of the present invention and elongate member that can be fastened into the binding head which can be combined to provide a binding arrangement for binding together at least two items.

The elongate member and binding head can be supplied separately or in combination as part of a kit. In some embodiments, a plurality of binding heads can be supplied separately for use with one or more elongate members. While in other embodiments, a plurality of binding heads and elongate members are supplied together.

Various forms of elongate members can be supplied for use with a binding head according to the first aspect of the present invention, and for a binding arrangement according to the second aspect of the present invention. In one form, discrete lengths or strips of an elongate member of a selected length or lengths can be supplied for use with a binding head according to the first aspect of the invention. In other embodiments, the elongate member comprises the discarded portion of a strap of a cable tie device. In yet other embodiments, the elongate member is supplied as a roll of a long elongate strip of material that can be cut to a desired length.

Each of the teeth of the elongate member can be any suitable protrusion, rib or the like that can co-operate with at least one of the first and second fastening arrangements to lock a portion of the elongate member into the fastening opening and locking opening respectively. In one preferred embodiment, the teeth of the elongate member are ratchet teeth arranged as a track substantially along the length of the elongate member. The track configuration provides a regular series of teeth along the length of the elongate member that can, in some embodiments, be used to select the portion of the elongate member to be locked in the respective fastening arrangements. This allows the fastening arrangement to be adjustable relative to the length of the elongate member.

Again, in some embodiments of this aspect of the present invention, each side of at least two separate lengthwise sides of the elongate member include at least one tooth of the teeth. Preferably, each of the sides including tracks of teeth. Again, it is preferable for the teeth of each of the sides to be orientated in different, preferably opposite directions along the length of the elongate member.

Of course, in some embodiments the binding head and the elongate member can be interconnected. Such an arrangement is convenient to use, as the appropriate binding head is provided in close proximity to the cooperating elongate member. In some embodiments, the binding head can also be configured to be selectively disconnected from the elongate member. This particular configuration allows a user to use the binding head from a first elongate member with a second elongate member in a location remote to the first elongate member.

In one preferred embodiment, the first elongate member also includes a fastening head having second fastening opening for receiving a fastening end of the first elongate member. The fastening opening preferably includes a third fastening arrangement configured to cooperate with at least one of the teeth of the first elongate member to lock a portion of the first elongate member within the second fastening opening.

According to a third aspect of the present invention, there is provided a cable tie, including:
an elongate member having at least a fastening end, and at least one lengthwise side that includes at least two teeth; and
a binding head connected to the elongate member, the binding head being spaced apart from the fastening end along the length of the elongate member,
wherein the binding head includes at least three openings for receiving a portion of at least one elongate member, the openings including:

a first fastening opening for receiving the fastening end of a further elongate member, the further elongate member having at least a fastening end, and at least one lengthwise side that includes at least two teeth, the fastening opening including a first fastening arrangement configured to cooperate with at least one of the teeth of the further elongate member to lock a portion of the further elongate member within the fastening opening;

a locking opening for receiving a locking end of the further elongate member, the locking end being an end of the further elongate member spaced apart from the fastening end of the further elongate member along the length of the further elongate member, the locking opening including a second fastening arrangement configured to cooperate with at least one of the teeth of the further elongate member to lock a portion of the further elongate member within the locking opening; and a second fastening opening for receiving the fastening end of the elongate member, the fastening opening including a third fastening arrangement configured to cooperate with at least one of the teeth of the elongate member to lock a portion of the elongate member within the third fastening opening.

Accordingly, this third aspect of the present invention provides a cable tie device having two additional fastening arrangements as compared to a traditional cable tie configuration. The two additional fastening arrangements can be used in conjunction with a further elongate member as a further binding arrangement, to bind together at least two items.

Again, the elongate member and further elongate member can be any suitable strip, tab, cord or the like that can cooperate with the various fastening arrangements in the binding head. In one preferred embodiment, the further elongate member is a portion of the elongate member. The locking end in such an embodiment is a severed end resulting from the elongate member being divided into at least two portions.

The binding head can have a number of configurations. In one embodiment, the binding head is a single body including each of the first fastening opening, second fastening opening and locking opening. In another embodiment, the binding head includes a separate sub-body containing only one of the fastening opening, second fastening opening or locking opening respectively. In a preferred embodiment, the binding head is formed from two interconnected sub-heads, including a first sub-head which includes the second fastening opening; and a second sub-head which includes the first fastening opening and the locking opening. Preferably, the second sub-head is a binding head according to the first aspect of the present invention.

It is preferable for each of the sub-heads to be interconnected. In a preferred form, the first sub-head is connected to the second subhead by a frangible connector. In this embodiment, it is preferable for the second sub-head to be arranged with the second fastening opening adjacent to the frangible connector. Moreover, in some embodiments, the elongate member is connected to the first sub-head.

Again, it is preferable for the teeth of the elongate member and further elongate member to include a plurality of ratchet teeth arranged as a track substantially along the length of the elongate member. Again, some embodiments of this aspect of the present invention include at least one tooth of the teeth located on each side of two separate lengthwise sides of the elongate member. Preferably, each of the lengthwise sides includes tracks of teeth. Again, it is preferable for the teeth of each of the sides to be orientated in different, preferably opposite directions along the length of the elongate member.

The cable tie according to the present invention can be manufactured using any number of suitable techniques ranging from moulding, pressing, cutting or the like. However, in terms of economics and manufacturing simplicity, it is preferred for the cable tie to be formed as a one piece plastic moulding.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
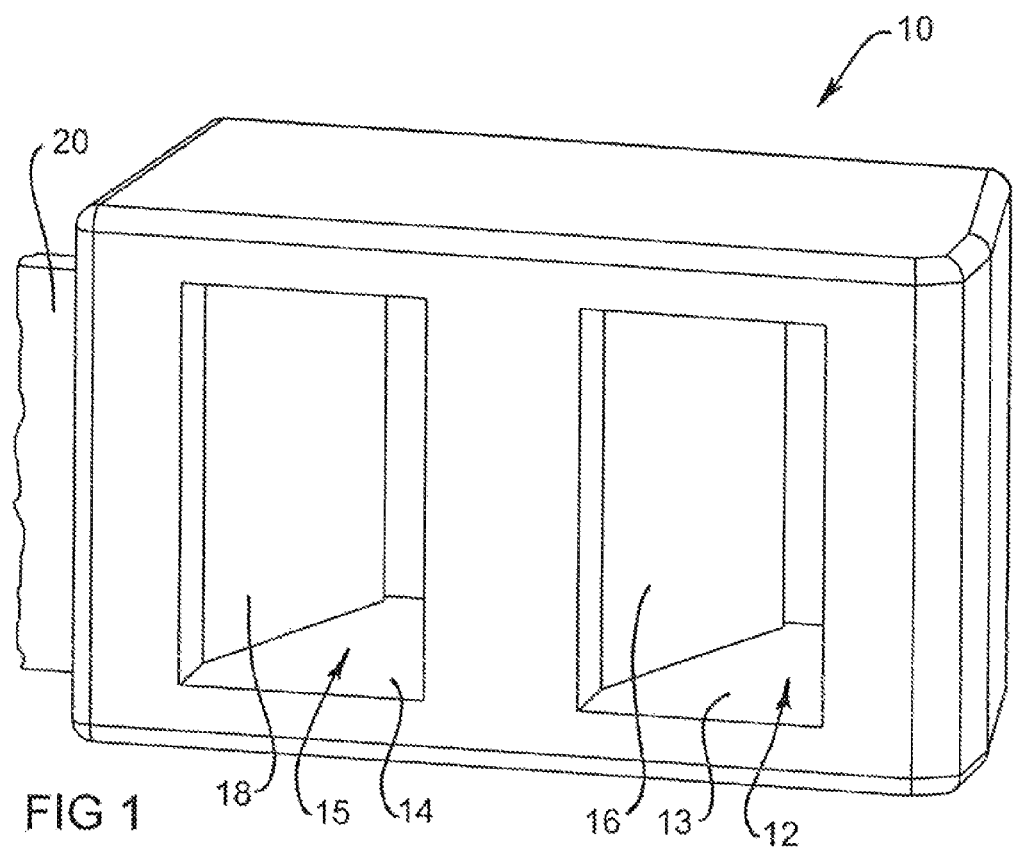
FIG. 1 is front perspective view of a binding head of one embodiment of a cable tie according to the present invention.
Figure 2:
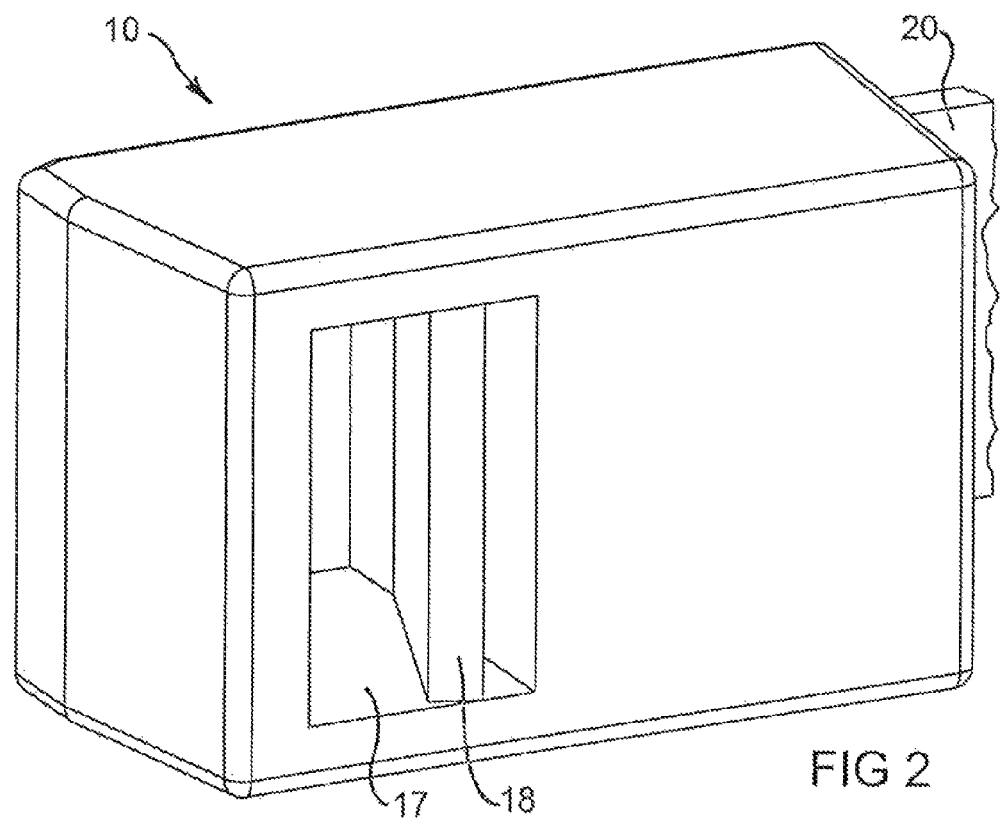
FIG. 2 is a rear perspective view of the binding head of FIG. 1.

Referring firstly to FIGS. 1 and 2, there is shown a binding head 10 according to one preferred embodiment of the present invention. The illustrated binding head 10 can be supplied separately or, as shown, in combination with further binding device, such as a conventional cable tie device 30 as shown in FIGS. 3 and 4 through the inclusion of a connection strip 20 that interconnects the binding head 10 to the further binding device.

The illustrated binding head 10 comprises a rectangular plastic moulded body having two square openings 12 and 14. The locking opening 12 is a blind opening having a front aperture 13 and rear wall 13A. The locking opening 12 functions to lock an end portion of a cooperating elongate strap (for example strap 32 in FIG. 4) inside the opening 12 using a fastening arrangement 16 situated inside the locking opening 12. The fastening opening 14 is a through-opening having a front aperture 15 (FIG. 1) and rear aperture 17 (FIG. 2) through which a cooperating elongate strap (for example strap 32 in FIG. 4) can be threaded. The fastening opening 14 also includes a fastening arrangement 18 which functions to lock a portion of a cooperating elongate strap (for example strap 32 in FIG. 4) into the fastening opening 14. As will be better explained with reference to FIG. 4, the configuration of the fastening arrangement 18 of the fastening opening 14 is the same as the configuration of the fastening arrangement 16 of the locking opening 12.

The illustrated configuration of the binding head 10 is intended to cooperate with a discarded section of strap 32 (termed additional elongate strap 32 hereinafter) from a conventional cable tie 30 to enable reuse of this section of strap in a further binding arrangement. This application is better illustrated in relation to the cable tie arrangement 28 shown in FIGS. 3 and 4. It should however be appreciated that the binding head 10 could be used with a purpose produced section of strap that has a similar configuration to that additional elongate strap 32.

Figure 3:
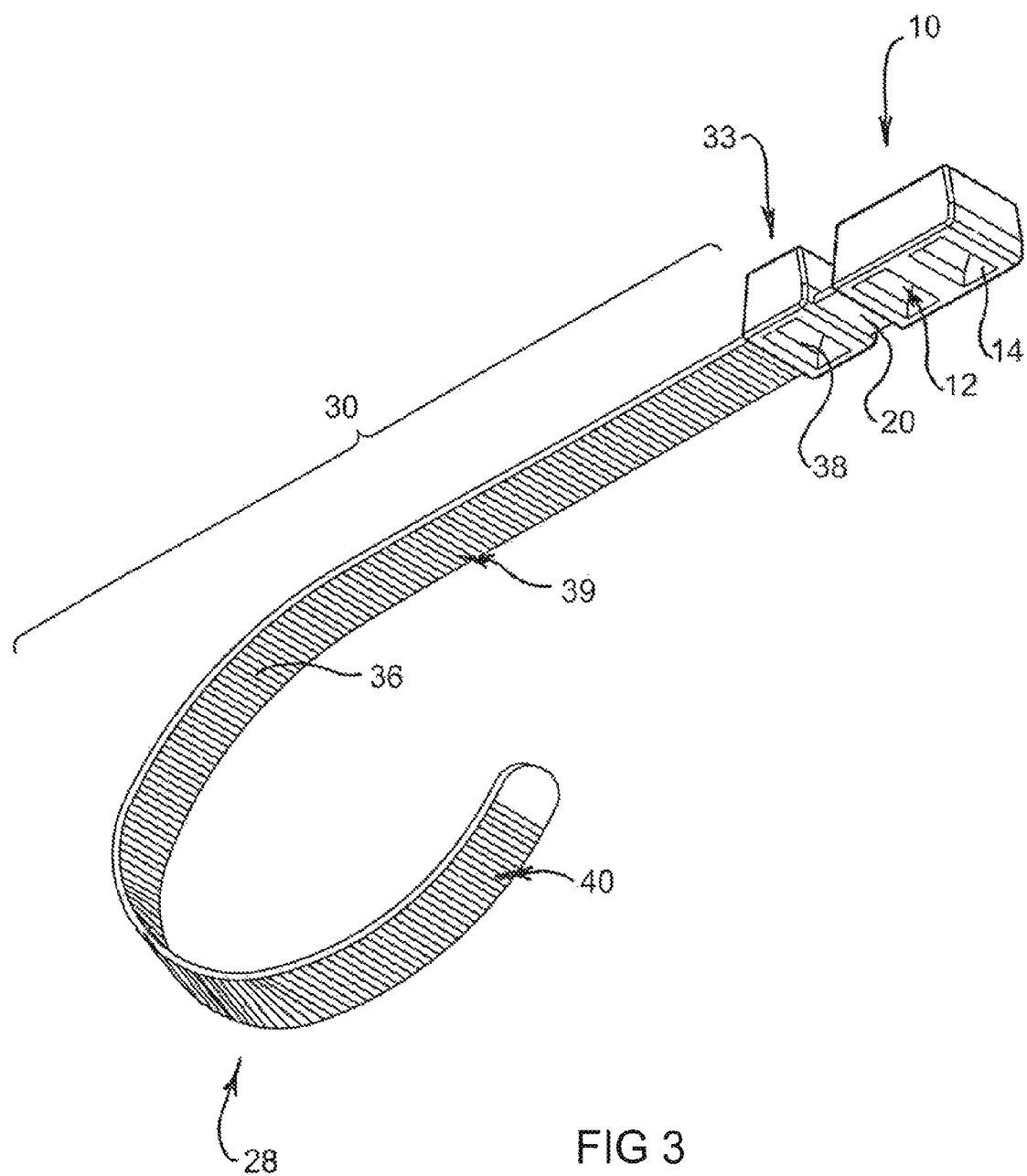
FIG. 3 is perspective view of one embodiment of a cable tie according to the present invention incorporating the binding head shown in FIGS. 1 and 2.
Figure 4:
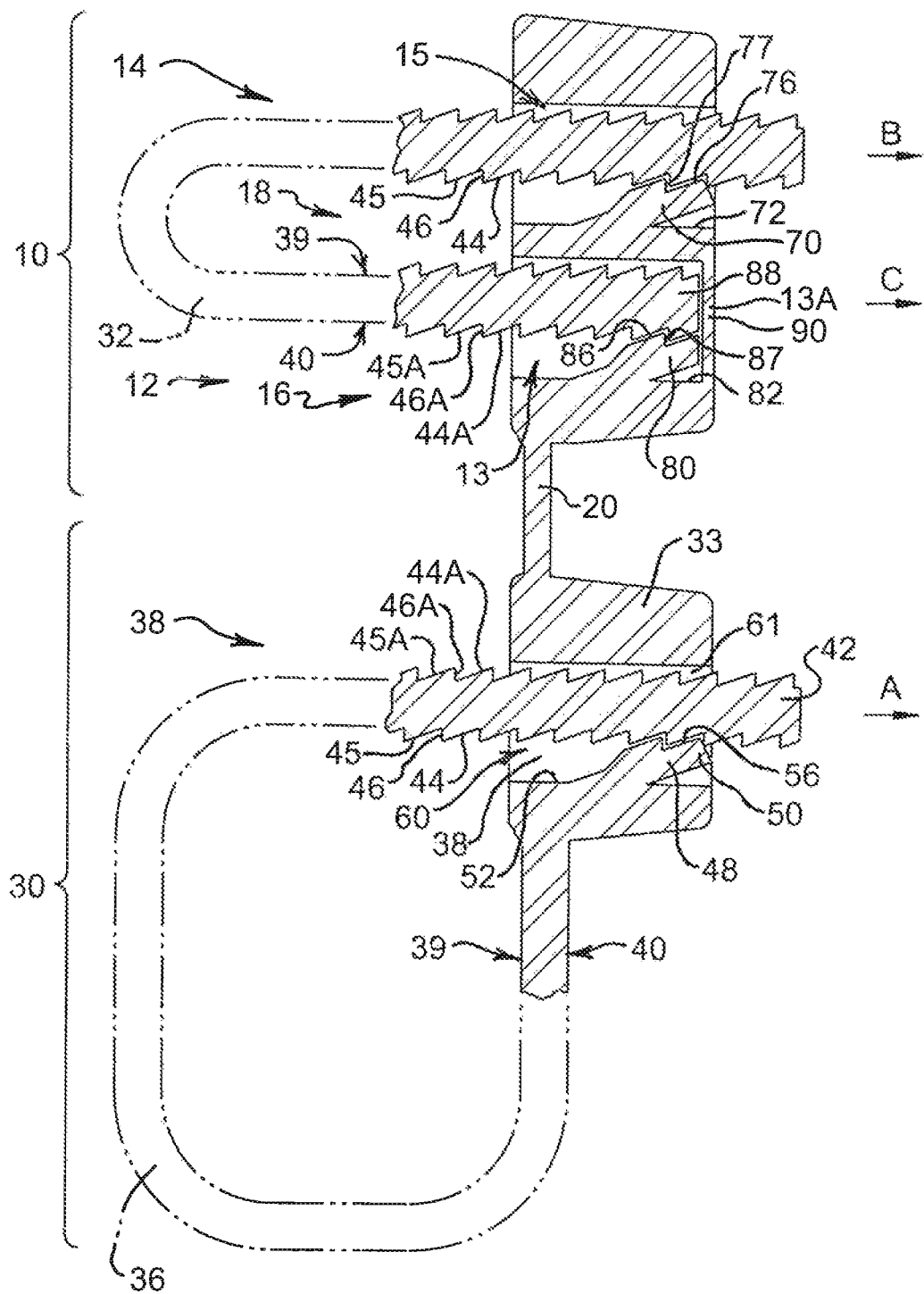
FIG. 4 is a longitudinal cross-sectional view of the cable tie shown in FIG. 3.

Referring now to FIGS. 3 and 4, there is shown a cable tie device 28 which includes a binding head 10 similar to the binding head 10 shown in FIGS. 1 and 2. Essentially, this cable tie device 28 comprises a binding head 10 similar to that shown in FIGS. 1 and 2 connected to the fastening head 33 of a conventional cable tie 30 through a frangible connection strip 20. The frangible strip 20 can be any connection section that can be cut, torn, twisted or broken. In the illustrated embodiment, the frangible strip 20 is a thin section of plastic that can be divided through the application of an appropriate force.

The conventional cable tie 30 section of the cable tie device 28 includes an integrally connected fastening head 33 and elongate strap 36. As best shown in FIG. 3, the fastening head 33 is a substantially square plastic body which includes a fastening opening 38. The elongate strap 36 is an elongate flat strip of plastic having two broad sides 39 and 40 and a free end, known as the fastening end 42.

Referring now to FIG. 4, it can be seen that each broad side 39 and 40 of the elongate strap 36 include a lengthwise track having a plurality of ratchet teeth 44 and 44A spaced along the length of each side of the elongate strap 36. Each of the ratchet teeth 44 of the first side 39 include a sloped surface 45 and stop face 46. Similarly, each of the ratchet teeth 44A of the second side 40 includes a sloped surface 45A and stop face 46A. The sloped surfaces 45 of the first side 39 are directionally arranged along the length of the elongate strap 36, with the sloped surfaces 45 sloping in a direction towards the fastening end 42. In comparison, the sloped surfaces 45A of the second side 40 are directionally arranged along the length of the elongate strap 36, with the sloped surfaces 45A sloping in the opposite direction to the sloped surfaces 45 of the first side 39. Accordingly, the tracks of ratchet teeth 44 and 44A on each side 39, 40 of the elongate strap 36 therefore have the same configuration but extend with the stop face 46 and 46A and sloped surfaces 45 and 45A in opposite directions along the length of the elongate strap 36. Only the teeth 44 of the first side 39 of the elongate strap 36 are intended for use with a fastening arrangement 48 located within the fastening opening 38.

As illustrated, the fastening opening 38 includes a uni-directional fastening arrangement 48 which cooperates with the teeth 44 of the first side 39 of the elongate strap 36 to lock a portion of the elongate strap 36 into the fastening opening 38. This fastening arrangement 48 includes a pawl 50 formed integrally with internal wall 52 of the fastening opening 38. The pawl 50 is resiliently biased to its engaged position (as shown) but may deflect through bending along its length. The pawl 50 includes a face 56 having a complementary shape to the shape of teeth 44 of the first side 39 of the elongate strap 36. In use, the fastening end 42 of the elongate strap 36 is inserted into the front aperture 60 and pulled through the fastening opening 38 in the direction of arrow A. During this action, the teeth 44 of the elongate strap 36 ride over the ramped backs of the face 56 of pawl 50. Any attempt to withdraw the elongate strap 36 from the fastening opening 38 in the opposite direction to arrow A causes the stop face 46 of the elongate strap 36 to engage with the complementary shaped face 62 of the pawl 50 and prevent retraction of the elongate strap 36.

As noted in relation to FIGS. 1 and 2, each of the fastening opening 14 and locking opening 12 also has an internal locking mechanism. The fastening opening 14 and locking opening 12 of the cable tie device 28 is configured to cooperate with an additional section of elongate strap 32. The illustrated additional elongate strap 32 is a severed section of an elongate strap 36 resulting from the elongate strap 36 being divided into at least two portions. For example, when the conventional cable tie section 30 is used to bind two items together, and elongate strap 36 is fastened within fastening head 33, an excess piece of the elongate strap 36 may extend from the rear aperture 61. This excess piece of elongate strap 36 may be cut off for atheistic reasons. This excess piece may be used as the additional elongate strap 32. However it should be appreciated that the binding head 10 could also be used with a purpose produced section of strap that has a similar configuration to the illustrated additional elongate strap 32.

The additional elongate strap 32 and the elongate strap 36 have a similar configuration. Accordingly, like features in the additional elongate strap 32 have been designated with the same reference numerals as used for similar features in the elongate strap 36. In this respect, each broad side 39 and 40 of the additional elongate strap 32 include a lengthwise track having a plurality of ratchet teeth 44 and 44A spaced along the length of each side of the elongate strap 36. Each of the ratchet teeth 44 of the first side 39 include a sloped surface 45 and stop face 46. Similarly, each of the ratchet teeth 44A of the second side 40 includes a sloped surface 45A and stop face 46A. The sloped surfaces 45 of the first side 39 are directionally arranged along the length of the elongate strap 36, with the sloped surfaces 45 sloping in a direction towards the fastening end 42. The sloped surfaces 45A of the second side 40 are directionally arranged along the length of the additional elongate strap 32, with the sloped surfaces 45A sloping in the opposite direction to the sloped surfaces 45 of the first side 39. Accordingly, the tracks of ratchet teeth 44 and 44A on each side 39, 40 of the additional elongate strap 32 therefore have the same configuration but extend with the stop face 46 and 46A and sloped surfaces 45 and 45A in opposite directions along the length of the additional elongate strap 32.

The fastening arrangement 18 of the fastening opening 14 is also a uni-directional fastening arrangement that includes a pawl 70 formed integrally with internal wall 72 of the fastening opening 14. The pawl 70 is resiliently biased to its engaged position (as shown) but may deflect through bending along its length. The fastening opening 14 is designed to receive a portion of the additional elongate strap 32. Accordingly, this pawl 70 also includes complementary shaped face 76 of the teeth 44 of the first side 39 of the elongate strap 32. This configuration allows the fastening end of the additional elongate strap 32 to be inserted into the front aperture 15 and pulled through the fastening opening 14 in the direction of arrow B. Again, any attempt to withdraw the additional elongate strap 32 from the fastening opening 14 will cause the stop face 46 of the additional elongate strap 32 to engage with the complementary shaped face 77 of the pawl 70 and prevent retraction of the additional elongate strap 32.

The locking opening 12 of the cable tie device 28 is configured to receive and lock a locking end portion 88 of the additional elongate strap 32 therein. The illustrated locking end portion 88 of the additional elongate strap 32 is a severed end of an elongate strap 36 resulting from the elongate strap 36 being divided into at least two portions.

Still referring to FIG. 4, it can be seen that the locking opening 12 is a blind opening having a sealed end 90. Nevertheless, the fastening arrangement 16 within the locking opening 12 has a similar configuration to the fastening arrangements 18 and 48 of the fastening openings 14 and 38. In this respect, the fastening arrangement 16 of the locking opening 12 is yet another uni-directional fastening arrangement that includes a pawl 80 formed integrally with internal wall 82 of the locking opening 12. The pawl 80 is resiliently biased to its engaged position (as shown) but may deflect through bending along its length. The locking opening 12 is designed to receive a locking end portion 88 of the additional elongate strap 32. Accordingly, this pawl 80 also includes complementary shaped face 86 of the teeth 44A of the second side 40 of the elongate strap 32. This configuration allows locking end portion 88 of the additional elongate strap 32 to be inserted into the front aperture 13 and through the locking opening 12 in the direction of arrow C and into engagement with the pawl 80. This locking end portion 88 can abut the sealed end 90 if inserted far enough, such as is shown in FIG. 4. Again, any attempt to withdraw the additional elongate strap 32 from the locking opening 12 will cause the stop face 46A of the additional elongate strap 32 to engage with the complementary shaped face 87 of the pawl 80 and prevent retraction of the additional elongate strap 32 from the locking opening 12.

The illustrated cable tie device 28 therefore provides a user with two binding arrangements that utilize portions of the elongate strap 36. A first binding arrangement can be formed using the conventional cable tie section 30 by inserting the elongate strap 36 into the fastening head 33. Once this binding arrangement has been formed, any excess piece of the elongate strap 36 extending from the rear aperture 61 may be cut off and utilised as an additional elongate strap 32 for the binding head 10. In this respect, the locking end portion 88 of the additional elongate strap 32 can be locked into locking opening 12 of the binding head 10. This combination forms a further cable tie type device that allows a user to use the additional elongate strap 32 to bind a further set of items utilising the fastening opening 14 of the locking head 10. Of course, this further device can be separated from the cable tie section 30 by dividing the frangible strip 20 into at least two separated section.

Those skilled in the art will appreciate that the invention described herein is susceptible to variations and modifications other than those specifically described. It is understood that the invention includes all such variations and modifications which fall within the spirit and scope of the present invention.

Throughout the description and claims of the specification the word "comprise" and variations of the word, such as "comprising" and "comprises", is not intended to exclude other additives, components, integers or steps.

I claim:

1. A cable tie, including:
   an elongate member having at least a fastening end, and at least one lengthwise side that includes at least two teeth; and
   a binding head connected to the elongate member, the binding head being spaced apart from the fastening end along the length of the elongate member,
   wherein the binding head includes at least three openings for receiving a portion of at least one elongate member, the openings including:
   a first fastening opening for receiving the fastening end of a further elongate member, the further elongate member having at least a fastening end, and at least one lengthwise side that includes at least two teeth, the first fastening opening including a first fastening arrangement configured to cooperate with at least one of the teeth of the further elongate member to lock a portion of the further elongate member within the first fastening opening;
   a locking opening for receiving a locking end of the further elongate member, the locking end being an end of the further elongate member spaced apart from the fastening end of the further elongate member along the length of the further elongate member, the locking opening including a second fastening arrangement configured to cooperate with at least one of the teeth of the further elongate member to lock a portion of the further elongate member within the locking opening; and
   a second fastening opening for receiving the fastening end of the elongate member, the second fastening opening including a third fastening arrangement configured to cooperate with at least one of the teeth of the elongate member to lock a portion of the elongate member within the second fastening opening,
   and wherein the binding head is formed from two interconnected sub-heads, including: a first sub-head which includes the second fastening opening; and
   a second sub-head which includes the first fastening opening and the locking opening.

2. A cable tie according to claim 1, wherein at least one of the first, second or third fastening arrangement includes at least one resilient member extending from an inner surface of the respective opening, and an abutment surface adjacent to the resilient member of the respective opening, such that in use, when a portion of the respective elongate member or further elongate member is inserted into the respective opening, the resilient member of the respective opening engages with at least one of the teeth of that elongate member, thereby securing said portion of that elongate member between at least one of the resilient members and the abutment surface.

3. A cable tie according to claim 2, wherein the resilient member of the respective opening includes an engagement surface having a substantially complementary configuration to at least one of the teeth of the respective elongate member or further elongate member.

4. A cable tie according to claim 3, wherein the engagement surface includes a portion which is generally perpendicular to the length of the respective elongate member or further elongate member configured to abut a complementary surface of the teeth of that elongate member to resist lengthwise movement of that elongate member in a direction away from the opening.

5. A cable tie according to claim 1, wherein the first fastening arrangement and second fastening arrangement have substantially the same configuration.

6. A cable tie according to claim 1, wherein the portion of the further elongate member that is locked within the locking opening is proximate the locking end of the further elongate member.

7. A cable tie according to claim 1, wherein the locking opening is a blind opening having an inner wall against which the locking end of the further elongate member can abut.

8. A cable tie according to claim 1, wherein at least one of the first fastening arrangement, second fastening arrangement or third fastening arrangement is a unidirectional fastening arrangement configured to engage with at least one of the teeth of the respective elongate member or further elongate member.

9. A cable tie according to claim 8, wherein the unidirectional fastening arrangement includes a pawl which, in use, engages with at least one of the teeth when the elongate member or further elongate member has been inserted through the respective opening.

10. A cable tie according to claim 1, wherein the first sub-head is connected to the second subhead by a frangible connector.

11. A cable tie according to claim 10, wherein the first sub-head is arranged with the second fastening opening adjacent to the frangible connector.

12. A cable tie according to claim 1, wherein the elongate member is connected to the first sub-head.

13. A cable tie according to claim 1, wherein the further elongate member comprises a portion of the elongate member, and wherein the locking end thereof is a severed end resulting from the elongate member being divided into at least two portions.

14. A cable tie according to claim 1, wherein the teeth of the elongate member and further elongate member are a plurality of ratchet teeth arranged as a track orientated along the length of the elongate member and further elongate member.

15. A cable tie according to claim 1, wherein at least the further elongate member includes at least two separate lengthwise sides including a first side that includes at least one tooth configured to cooperate with the first fastening arrangement to lock a portion of the further elongate member within the first fastening opening and a second side that includes at least one tooth configured to cooperate with the second fastening arrangement to lock a portion of the further elongate member within the locking opening.

16. A cable tie according to claim 15, wherein the teeth of the first side of at least one of elongate member or the further elongate member are arranged as a track orientated along the length of that elongate member in a first direction and the teeth of the second side of the respective elongate member are arranged as a track orientated along the length of that elongate member in a second direction.

17. A cable tie according to claim 16, wherein the first direction is in substantially the opposite direction to the second direction with respect to the length of the elongate member.

18. A cable tie according to claim 1, wherein the cable tie is formed as a one piece plastic moulding.

* * * * *

UNITED STATES PATENT AND TRADEMARK OFFICE
CERTIFICATE OF CORRECTION

PATENT NO.       : 8,474,104 B2                                              Page 1 of 1
APPLICATION NO. : 13/054196
DATED            : July 2, 2013
INVENTOR(S)      : Robert Baird Watson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 235 days.

Signed and Sealed this

Eighth Day of September, 2015

Michelle K. Lee
*Director of the United States Patent and Trademark Office*